Feb. 24, 1959　　　M. J. STATEMAN　　　2,875,398
LOW FREQUENCY MAGNETIC GENERATOR
Filed Oct. 22, 1954
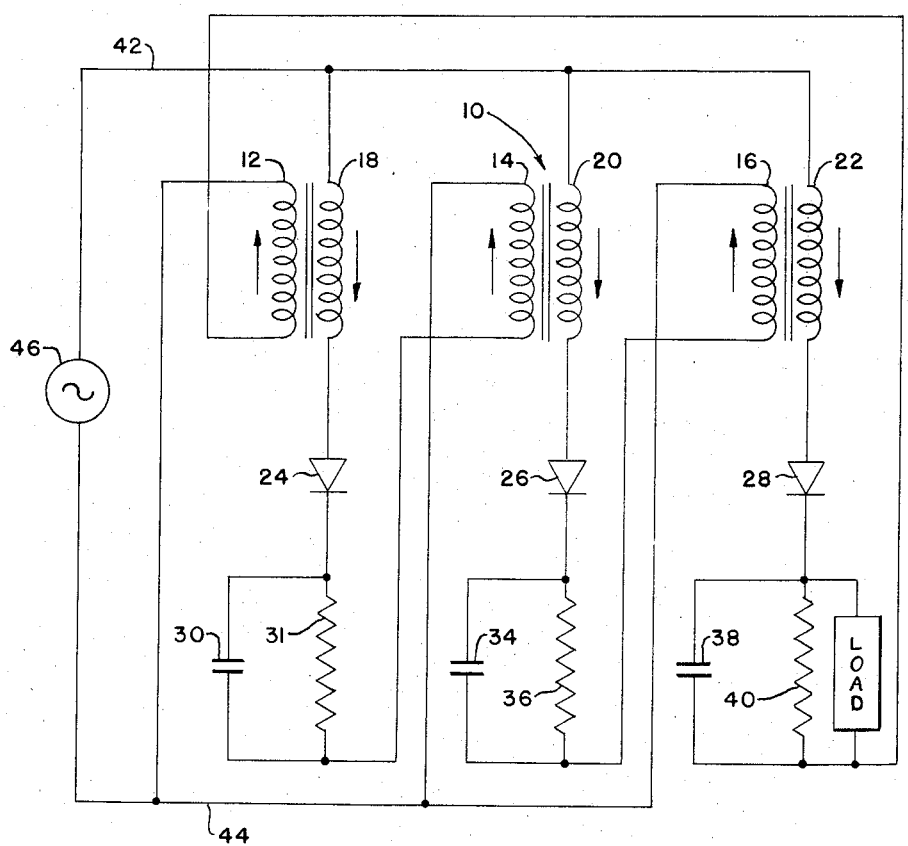
INVENTOR
MURRAY J. STATEMAN
BY *Michael Herz*
ATTORNEY

United States Patent Office 2,875,398
Patented Feb. 24, 1959

2,875,398

LOW FREQUENCY MAGNETIC GENERATOR

Murray J. Stateman, Wantagh, N. Y., assignor to Sylvania Electric Products Inc., a corporation of Massachusetts Application October 22, 1954, Serial No. 463,864

4 Claims. (Cl. 321—69)

This invention relates to a static inductor device for converting impressed voltages at a given frequency to voltages at any desired lower frequency.

Means and methods have been utilized in the prior art to convert frequencies. Thus it is old to utilize static inductor devices to obtain higher frequencies than those impressed on the inductor; it is also old, of course, to heterodyne voltages at different frequencies; also it is old to convert, by means of static devices, polyphase currents into monophase currents at a sub-multiple of the polyphase frequency; it is even old, utilizing static devices in combination with other devices including a commutator of some sort, to convert a voltage at a given frequency into a voltage at a desired lower frequency. However, no simple wholly static arrangement, prior to applicant's teaching, was known for converting a pulsating or alternating voltage of a given frequency to any desired lower frequency.

It is an object of this invention to provide a means whereby a monophase periodic fluctuating voltage may be converted into a similar periodic fluctuating voltage but at a lower frequency.

A further object of the invention is to accomplish this transformation without the use of moving parts.

A still further object of the invention is to provide a static device to convert a voltage at any given frequency to any lower given frequency desired.

These and other objects will be apparent after reading the specification and claims in conjunction with the accompanying drawing in which the single figure represents diagrammatically the circuit employed to accomplish the conversion.

The converter is comprised of any odd number of cascaded low frequency generator units in excess of one, each generator unit comprising a magnetic inductor, a rectifier and a time delay line. In the drawing the minimum number of three generators has been illustrated.

The magnetic inductor of each generator unit is here illustrated as a two winding transformer 10, although equivalent devices such as an autotransformer may be employed. Each transformer has a control winding indicated as 12, 14, and 16 respectively, and an exciter winding, indicated as 18, 20, and 22, respectively. In series with each of the exciter windings is a half wave rectifier 24, 26 or 28, in turn series connected with an RC circuit comprised of a condenser 30 and bridging resistor 31. The RC combinations are each preferably of the same magnitude and are each connected to the control winding of the next cascaded generator unit with the last RC combination connected to the control winding of the first generator unit thereby arranging the generators in cyclic fashion. Thus the first RC combination comprised of condenser 30 and resistor 31 is connected to the control winding 14; the second RC combination 34, 36 is connected to the control winding 16; the final RC combination 38, 40, is connected to the first control winding 12. Although rectifiers and RC combinations have been illustrated as a delaying network, it is obvious that other forms of delay network or delay lines may be employed. Each of the generator units comprising series connected control winding, delay line and exciter winding is bridged in parallel with the other units across the supply line 42, 44 fed by generator 46 which may be any A.-C. or pulsating source and which conveniently may be the conventional 60 cycle 117 volt house supply.

An A.-C. current of a frequency determined by the value of an RC combination and lower than the applied frequency may be obtained from any points within the generator unit circuits across which a difference in potential exists, as, across one of the resistors 31 or 36, or across resistor 40 as illustrated, or a load may be inserted into the system by breaking into any of the lines of the generator units and points on the load tapped.

The operation is as follows:

Let it be assumed that at a moment of time a waxing pulse of current is flowing downwardly through exciter winding 18. The waxing current flows through the control winding 14 in a direction to create an increasing flux bucking the flux created by exciter winding 20. If initially the impedance to the flow of current through exciter winding 20 be low due to near saturation of the core by current flow through the winding 20 then the impedance will be increased as the current grows in winding 14, due to the net flux through the core of the transformer diminishing. This results in a decrease of current flow through the exciter winding 20 and also through the series connected control winding 16. The decrease in current flow in winding 16 reduces the bucking effect on the flux of the associated core allowing that core to approach saturation and thereby diminishing the impedance of exciter winding 22. As a result more current flows through the winding 22 and therefore more current flows through series connected control winding 12. This in turn reduces the net flux in the core associated with the winding, increasing the permeability of the core, increasing the impedance of exciter winding 18 and decreasing the current through it. The decreasing current through exciter winding 18 also results in a decreasing current in control winding 14. This last condition is the reverse of the condition originally assumed. Therefore, there has been a pulse of current transmitted through the converter. Since the RC combinations interposed delays in the pulse, the frequency of oscillation of the converter is less than the applied frequency, the actual frequency depending on the R, L and C constants in the circuit.

The generator units are all in parallel relation across the line 42, 44. The starting of the cycle therefore depends upon a transient which for a moment causes more current to flow in one unit than another, as for example, a momentary slight change in resistance of a rectifier unit. Once the transient is effective into shocking the system into operation the oscillations grow, being limited only by the impedance of the system and the load across it.

Having thus described the invention what is claimed as new is:

1. A frequency converter comprised of an odd number of inductive cascaded cyclically arranged generators, each generator comprising an exciting winding and a bucking control winding, each exciter winding being series connected with a rectifier, a delay line and the control winding of the next generator in the cyclic arrangement, means connecting together free terminals of all of the exciter windings to form one pole of the converter, and means connecting together free terminals of all of the control windings to form a second pole of the converter.

2. A frequency converter comprised of an odd number of inductive generators, each generator comprising an exciting winding and a bucking control winding, each exciter winding having connected in series therewith a delay line, said delay line having therein a rectifier connected in series with a parallel arrangement of resistance and condenser, a series connection between the parallel resistance and condenser and the control winding of another generator, all of the otherwise free terminals of the exciter windings being connected together and forming one pole of the converter and all of the otherwise free terminals of the control windings being connected together and forming the other pole of the converter.

3. A frequency converter comprised of an odd number of inductive generators arranged in cascaded cyclic formation, each generator comprising an exciting winding and a bucking control winding, each exciter winding having connected in series therewith a delay line, said delay line having therein a rectifier connected in series with a parallel arrangement of resistance and condenser, a series connection between the paralleled resistance and condenser and the control winding of the next generator in the cyclic series, all of the otherwise free terminals of the exciter windings being connected together and forming one pole of the converter and all of the otherwise free terminals of the control windings being connected together and forming the other pole of the converter.

4. A frequency converter comprising an odd number of cascade connected inductive generators each comprising a core having an exciting winding and a bucking control winding thereon, a connection including a rectifier and a delay line between one terminal of each exciting winding to one terminal of the control winding of the next generator, means connecting together the other terminals of all of the exciting windings and forming a first pole of the converter, means connecting together the other terminals of all of the control windings and forming a second pole of the converter, and a source of alternating current connected across said first and second poles.

References Cited in the file of this patent

UNITED STATES PATENTS 2,418,640     Huge  ------------------ Apr. 8, 1947